Oct. 17, 1944.  E. A. WOJTAN  2,360,531
LOCK NUT
Filed Oct. 9, 1942
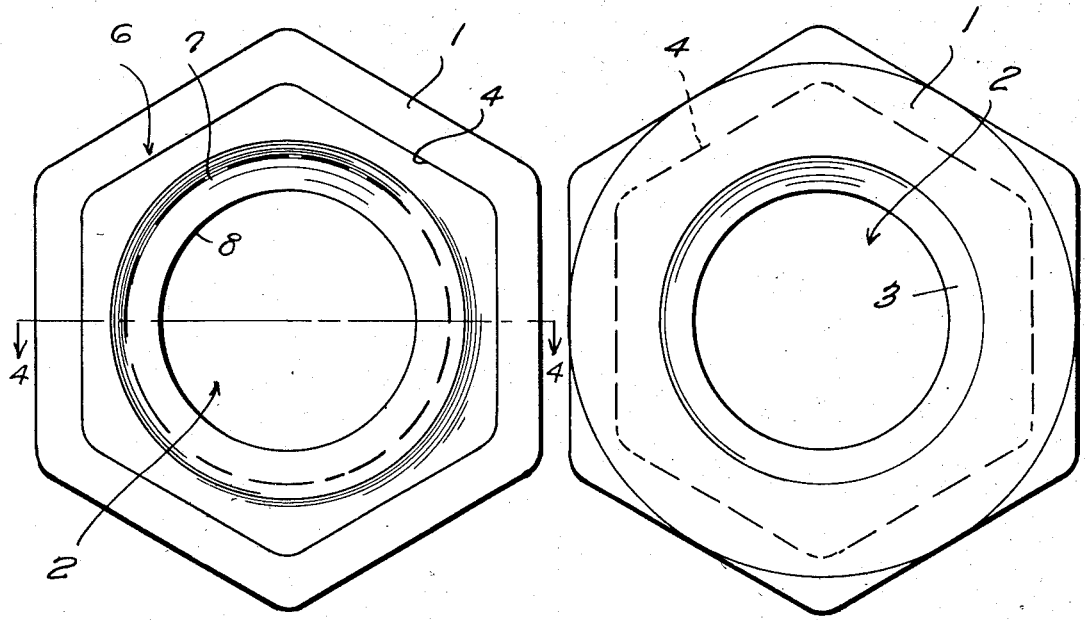
Fig. 1.  Fig. 2.  Fig. 3.  Fig. 4.
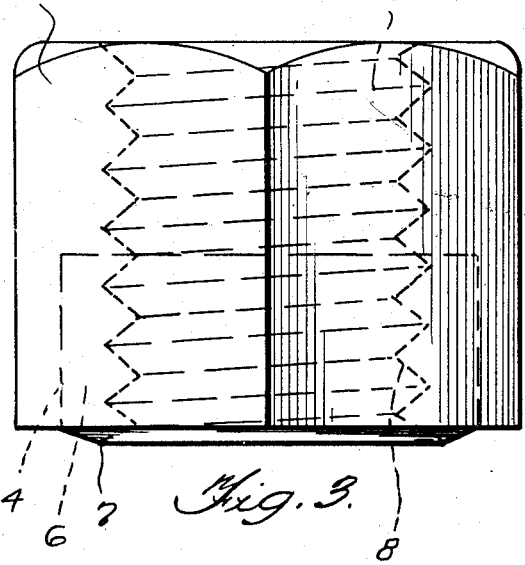
Inventor
Edwin A. Wojtan
By Clarence A. O'Brien
and Harvey B. Jacobson
Attorneys Patented Oct. 17, 1944

2,360,531

UNITED STATES PATENT OFFICE 2,360,531

LOCK NUT

Edwin A. Wojtan, Buffalo, N. Y., assignor to Vincent L. Kruszynski, Buffalo, N. Y.

Application October 9, 1942, Serial No. 461,441

1 Claim. (Cl. 151—7)

The present invention relates to new and useful improvements in lock nuts of the type comprising a distortable element for gripping the thread of a bolt and has for its primary object to provide, in a manner as hereinafter set forth, novel means for distorting said element when the nut is tightened on the work.

Other objects of the invention are to provide a lock nut of the character described which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein—

Figure 1 is a bottom plan view of a lock nut constructed in accordance with the present invention.

Figure 2 is a top plan view thereof.

Figure 3 is a view in side elevation.

Figure 4 is a vertical sectional view, taken substantially on the line 4—4 of Figure 1.

Referring now to the drawing in detail, it will be seen that the embodiment of the invention which has been illustrated comprises a hexagonal body 1 of suitable metal. The body 1 has formed therein a bore 2 the outer portion of which is threaded, as at 3. The bore 2 further includes an enlarged hexagonal, unthreaded inner portion 4 providing a shoulder 5.

The enlargement 4 is for the reception of an internally threaded, distortable, plastic or fibre bushing 6 which abuts the shoulder 5. The bushing 6 comprises an end portion 7 of substantially V-shaped cross section which projects from the corresponding end of the body 1. Due to the V-shape of the projecting portion, the compression force is applied near the bore of the bushing to cause the walls of the thread of the bushing to tightly grip the walls of the thread on the adjacent part of the bolt. This compression is therefore more effectively had with application of less turning power to the nut than would be required if the projecting portion 7 were provided with a flat inner or exposed face for contact with the work.

It is thought that the operation of the device will be readily apparent from a consideration of the foregoing. The thread 8 of the distortable bushing 6 constitutes a continuation of the thread 3. Thus, the device may be screwed on a bolt in the usual manner. When the lock nut is screwed on a bolt the substantially V-shaped protruding end 7 of the bushing 6 is the first to engage the work. When the lock nut is tightened through the medium of a wrench or other suitable tool, the protruding end 7 compresses and bulges the distortable bushing 6 in a manner to cause the same to lock itself on the bolt. The bushing 6 conforms to the shape of the hexagonal enlargement 4 and is thus caused to turn in unison with the body 1.

It is believed that the many advantages of a lock nut constructed in accordance with the present invention will be readily understood and although a preferred embodiment of the device is as illustrated and described, it is to be understood that changes in the details of construction may be resorted to which will fall within the scope of the invention as claimed.

What is claimed as new is:

A lock nut of the character described comprising a metallic body having a bore therein comprising a threaded end portion and an enlarged, polygonal unthreaded end portion providing a shoulder, and an internally threaded, polygonal bushing of distortable material snugly fitted in the enlarged portion of the bore in abutting engagement with the shoulder, said bushing including an end portion of substantially V-shaped cross section projecting from the corresponding end of the body.

EDWIN A. WOJTAN.